(12) United States Patent
Baek (10) Patent No.: US 9,818,990 B2
(45) Date of Patent: Nov. 14, 2017

(54) BATTERY PACK WITH SHOCK ABSORBER (75) Inventor: Woon-Seong Baek, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 674 days.

(21) Appl. No.: 13/080,635

(22) Filed: Apr. 5, 2011

(65) Prior Publication Data
US 2012/0052333 A1 Mar. 1, 2012

Related U.S. Application Data (60) Provisional application No. 61/377,885, filed on Aug. 27, 2010.

(51) Int. Cl.
| | | |
|---|---|---|
| H01M 2/04 | (2006.01) | |
| H01M 10/04 | (2006.01) | |
| H01M 10/42 | (2006.01) | |
| H01M 2/10 | (2006.01) | |

(52) U.S. Cl.
CPC ....... *H01M 2/0404* (2013.01); *H01M 2/0473* (2013.01); *H01M 2/0478* (2013.01); *H01M 2/0482* (2013.01); *H01M 2/10* (2013.01); *H01M 10/0431* (2013.01); *H01M 10/425* (2013.01)

(58) Field of Classification Search
None
See application file for complete search history.

(56) References Cited

U.S. PATENT DOCUMENTS

| | | |
|---|---|---|
| 2003/0077486 A1 | 4/2003 | Iwaizono et al. |
| 2004/0251872 A1 | 12/2004 | Wang et al. |
| 2009/0155631 A1 | 6/2009 | Baek et al. |
| 2009/0186268 A1* | 7/2009 | Song .............................. 429/163 |
| 2009/0269620 A1* | 10/2009 | Kim ................................. 429/7 |
| 2009/0305117 A1 | 12/2009 | Koh et al. |

FOREIGN PATENT DOCUMENTS

| | | |
|---|---|---|
| EP | 2 079 126 A1 | 7/2009 |
| JP | 2001-196048 | 7/2001 |
| JP | 2009-170417 A | 7/2009 |
| KR | 10-2004-0010998 A | 2/2004 |
| KR | 10-2006-0032591 | 4/2006 |
| KR | 10-2006-0034180 A | 4/2006 |
| KR | 10-2008-0042302 | 5/2008 |

(Continued)

OTHER PUBLICATIONS

"shock absorber." Dictionary.com Unabridged. Random House, Inc. Jul. 15, 2014. <Dictionary.com http://dictionary.reference.com/browse/shock absorber>.*

(Continued)

*Primary Examiner* — Maria J. Laios
*Assistant Examiner* — Robert S. Carrico
(74) *Attorney, Agent, or Firm* — Lewis Roca Rothgerber Christie LLP (57) ABSTRACT A battery pack includes a bare cell including an electrode assembly, a can housing the electrode assembly; and a cap plate sealing an open end of the can; a protective circuit module on the bare cell and including a lead member electrically coupling the protective circuit module to the bare cell; an upper cover coupled to the bare cell and covering the protective circuit module; and a shock absorber between the upper cover and the lead member.

10 Claims, 8 Drawing Sheets (56) References Cited

FOREIGN PATENT DOCUMENTS

| KR | 10-2009-0051373 | 5/2009 |
|----|----|----|
| KR | 10-2009-0063846 | 6/2009 |
| KR | 10-2009-0078181 | 7/2009 |
| KR | 10-2010-0012053 A | 2/2010 |
| WO | WO 2009/066953 A2 | 5/2009 |

OTHER PUBLICATIONS

European Search Report dated Dec. 19, 2011, for corresponding European Patent application 11170500.0, noting listed references in this IDS.
KIPO Office action dated Mar. 28, 2013 for corresponding KR application No. 10-2011-0055738 (5 pages).
KIPO Office action dated Sep. 26, 2012, for corresponding Korean Patent application 10-2011-0055738, (9 pages).
Office Action dated Apr. 23, 2013 issued in Japanese Patent Application No. 2011-181144, 2 pages.
SIPO Office action dated Jul. 28, 2014, with English translation, for corresponding Chinese Patent application 201110254555.5, (16 pages).
SIPO Office action dated Mar. 25, 2015, with English translation, for corresponding Chinese Patent application 201110254555.5, (15 pages).
SIPO Office action dated Sep. 24, 2015, with English translation, for corresponding Chinese Patent application 201110254555.5, (7 pages).

\* cited by examiner

BATTERY PACK WITH SHOCK ABSORBER

CROSS-REFERENCE TO RELATED APPLICATIONS

This application claims priority to and the benefit of U.S. Provisional Application No. 61/377,885, filed on Aug. 27, 2010, in the United States Patent and Trademark Office, the disclosure of which is incorporated herein in its entirety by reference.

BACKGROUND

1. Field

One or more embodiments of the present invention relate to a battery pack.

2. Description of the Related Art

There is an increasing demand for using a secondary battery as an energy source according to technology development and an increase of the manufacture thereof with respect to mobile devices such as mobile phones, notebooks, and the like. Recently, as a substitute energy source for replacing fossil fuel, secondary batteries have been studied and developed to be used in electric vehicles and hybrid vehicles.

In general, a secondary battery includes an inflammable material, and in consideration of stability of the secondary battery, the secondary battery has a circuit for efficiently controlling abnormal operation states including overcharge, overdischarge, overcurrent, and the like. Also, the secondary battery is used in the form of a battery pack having a cover so as to protect and insulate the circuit from an external environment.

Recently, due to an increase in using mobile devices, the greater capacity of the battery pack in the same volume becomes important. However, reliability conditions for verifying the battery pack are the same as before.

SUMMARY

When a weight and volume of a battery pack are increased, the most deteriorating characteristic from among reliability conditions is a falling characteristic. This is because a shock at the free fall is increased according to an increase of the volume of the battery pack. This causal relationship highly damages the battery pack in a free fall test, and the biggest problem is that resistance of a charge-discharge path, which directly affects an efficiency of the battery pack, is increased.

One or more embodiments of the present invention include a battery pack of which reliability with respect to an external shock is increased.

One or more embodiments of the present invention include a battery pack in which electric resistance of a charge-discharge path is remained at a low level, in spite of an external shock.

According to one embodiment of the present invention, a battery pack is provided including a bare cell comprising an electrode assembly, a can housing the electrode assembly; and a cap plate sealing an open end of the can; a protective circuit module on the bare cell and including a lead member electrically coupling the protective circuit module to the bare cell; an upper cover coupled to the bare cell and covering the protective circuit module; and a shock absorber between the upper cover and the lead member.

In one embodiment, the shock absorber is made from a rubber-based material or a silicon-based material and further, the upper cover and the shock absorber may be made from different materials. Additionally, the upper cover and the shock absorber may be integral as a single unit.

In one embodiment, the shock absorber directly contacts the bare cell. More specifically, in one embodiment, a first surface of the shock absorber directly contacts the lead member and a second surface of the shock absorber directly contacts the upper cover. The shock absorber may be compressed to bias the lead member towards the bare cell.

In one embodiment, the lead member has an opening aligned with an opening on the shock absorber, and wherein a coupling member extends through the openings on the lead member and on the shock absorber to couple the lead member and the shock absorber together. The shock absorber may include a plurality of shock absorbing members spaced from each other. Further, in one embodiment, a thickness of a first one of the shock absorbing members is different from a thickness of a second one of the shock absorbing members.

In one embodiment, the upper cover and the shock absorber have openings that are aligned with each other and a coupling member extends through the openings on the upper cover and the shock absorber to couple the upper cover and the shock absorber together. Further, a coupling member may be coupled to the cap plate and may couple the upper cover, the shock absorber, the lead member and the cap plate of the bare cell together.

In one embodiment, the upper cover has a stepped portion and an edge portion adjacent to the stepped portion, and the shock absorber contacts the stepped portion and the edge portion. Additionally, in one embodiment, the upper cover has a substantially planar mounting portion extending therefrom at which an opening configured to receive a coupling member is located, and the shock absorber is between the mounting portion and the lead member.

According to one or more embodiments of the present invention, when an upper cover is coupled to a bare cell capable of being charged and discharged, and/or a lead member contacting the bare cell, a shock absorbing layer is interposed therebetween. By doing so, although a strong external shock such as a free fall is applied via the upper cover, the shock absorbing layer absorbs or relieves a shock conveyed to the bare cell and/or the lead member, so that it is possible to prevent a damage or deformation of the bare cell and the lead member. Coupling between the bare cell and the lead member that form an electric contact is protected against the strong external shock, and the deformation due to the strong external shock is prevented so that electric resistance of a charge-discharge current path formed by the lead member may be maintained at a low level.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

As used herein, the term "and/or" includes any and all combinations of one or more of the associated listed items.

Figure 1:
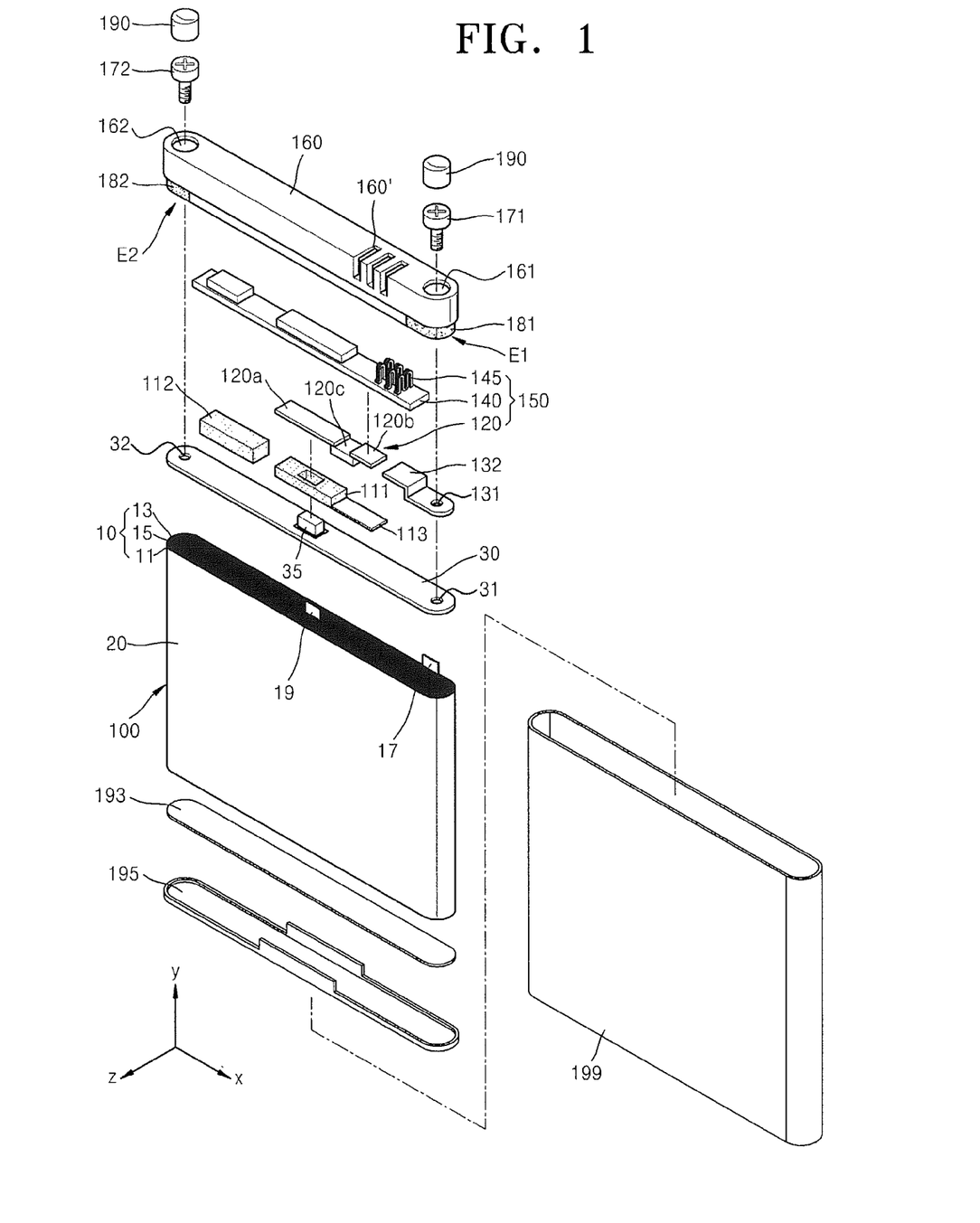
FIGS. 1 through 3 are exploded perspective views of a battery pack according to an embodiment of the present invention.
Figure 2:
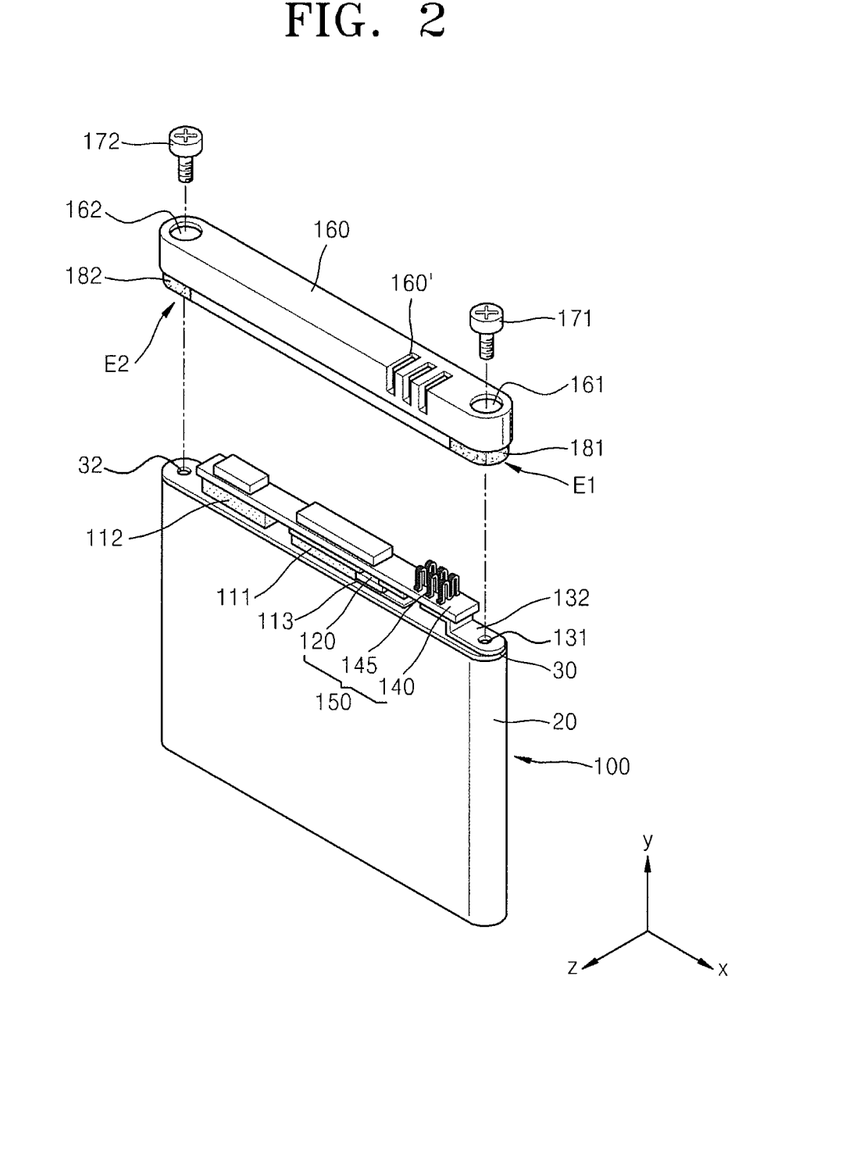
Figure 3:
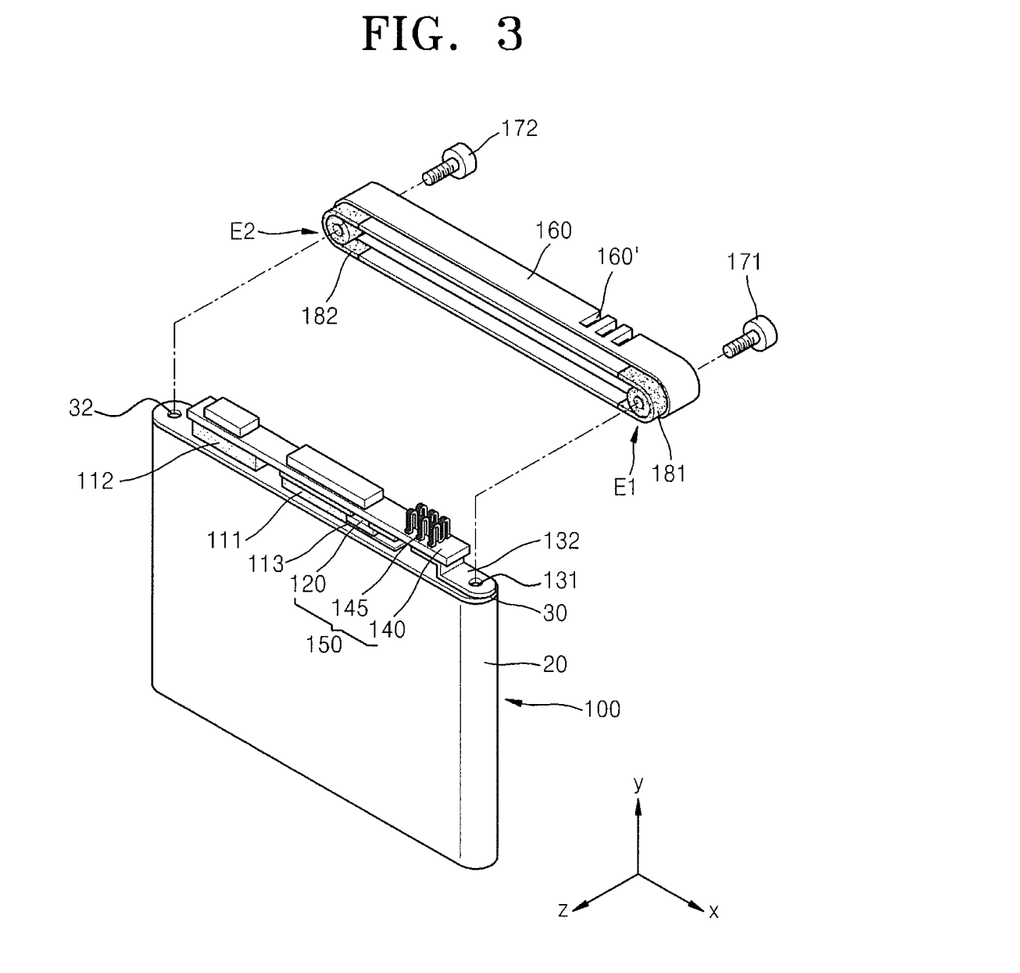

FIGS. 1 through 3 are exploded perspective views of a battery pack according to an embodiment of the present invention.

The battery pack includes a bare cell 100 capable of being charged and discharged, a protective circuit module (PCM) 150 mounted on the bare cell 100 so as to control charging and discharging operations of the bare cell 100, and an upper cover 160 coupled with the bare cell 100 so as to receive the PCM 150.

The bare cell 100 is a rechargeable secondary battery, may be formed of a lithium-ion battery, and has a structure in which an electrode assembly 10 including a positive electrode plate 11, a negative electrode plate 13, and a separator 15 is placed into contact with an electrolyte and then sealed in a can 20. For example, the bare cell 100 includes the electrode assembly 10 in the shape of a jelly roll formed by rolling the positive electrode plate 11, the negative electrode plate 13, and the separator 15; the can 20 having an opening at its top surface so as to receive the electrode assembly 10 and the electrolyte therein; and a cap plate 30 for sealing the opening of the can 20. A contact between the cap plate 30 and the can 20 may be laser-welded to form a sealed combination.

At least one of the positive electrode plate 11 and the negative electrode plate 13 may be connected to a positive electrode tab 17 and a negative electrode tab 19, respectively. For example, the positive electrode tab 17 may be connected to the cap plate 30, and the negative electrode tab 19 may be connected to an electrode terminal 35 that is upwardly projected from the cap plate 30. The electrode terminal 35 is coupled with and insulated from the cap plate 30, and is upwardly projected from the cap plate 30.

The PCM 150 controls the charging and discharging operations of the bare cell 100, and when overcurrent greater than a threshold value flows, when a temperature of the bare cell 100 exceeds a predetermined value, or when overcharge or overdischarge occurs, the PCM 150 blocks the electrical connection and performs a protective operation for protecting the bare cell 100. For example, the PCM 150 may include a circuit substrate 140 having a sensing circuit for detecting status information regarding a current, a voltage, and the like, and a charge-discharge protective circuit, and a protecting device 120 connected to the circuit substrate 140 and restricting a charge-discharge current according to a rise in temperature.

The circuit substrate 140 may be formed of a printed circuit board (PCB) that includes a wire pattern so as to form a charge-discharge current path between an external device and the bare cell 100, and includes a protective circuit. An external connection terminal 145 for relaying electrical connection with the external device may be arranged on the circuit substrate 140.

The protecting device 120 forms a current path between the electrode terminal 35 of the cap plate 30 and the circuit substrate 140. When the temperature of the bare cell 100 exceeds a predetermined threshold value, the protecting device 120 functions to forcibly decrease the charge-discharge current by increasing electric resistance. The protecting device 120 may include a positive temperature coefficient (PTC) device or a temperature fuse. When the protecting device 120 is formed as the PTC device, the PTC protecting device 120 may include a variable resistor 120c of which electric resistance value varies according to a temperature, and first and second connecting members 120a and 120b that are connected to the variable resistor 120c and extend in opposite directions. For example, the first connecting member 120a is connected to the electrode terminal 35 of the cap plate 30, while the second connecting member 120b is connected to the circuit substrate 140.

The positive electrode tab 17 and the negative electrode tab 19 of the bare cell 100 are electrically connected to electrode pads of the circuit substrate 140, respectively. For example, the negative electrode tab 19 of the bare cell 100 may be connected to a first electrode pad of the circuit substrate 140 via the electrode terminal 35 and the protecting device 120, and the positive electrode tab 17 of the bare cell 100 may be connected to a second electrode pad of the circuit substrate 140 via the cap plate 30 and a lead member 132. The lead member 132 may have a stepped shape that is bent to have upper and lower portions that are stepped with respect to each other, and the upper portion may be connected to the circuit substrate 140 and the lower portion may extend to contact a top surface of the cap plate 30. The lead member 132 may be soldered to the second electrode pad of the circuit substrate 140. Also, the lead member 132 may be fixed on the cap plate 30 by using a coupling member 171, and for this coupling, a opening for insertion of the coupling member 171 may be formed in the lead member 132.

Insulating members 111 and 112 may be located between the PCM 150 and the bare cell 100. For example, the insulating members 111 and 112 may include a first insulating member 111 formed to surround the electrode terminal 35, and a second insulating member 112 located between the cap plate 30 and the circuit substrate 140. The insulating members 111 and 112 function to fix the PCM 150 on the bare cell 100, and to prevent an electric short between the bare cell 100 and the PCM 150. Also, the insulating members 111 and 112 may provide elastic support between the PCM 150 and the bare cell 100, and to absorb a shock. Meanwhile, another insulating member 113 may be located between the protecting device 120 and the cap plate 30.

The upper cover 160 is coupled the bare cell 100 so as to receive the PCM 150. A terminal hole 160' of an opening pattern may be formed in the upper cover 160 so as to expose the external connection terminal 145, and to allow access with the external device.

An insulating label sheet 199 having an adhesive coated therein may be adhered to an outer surface of the bare cell 100. In one embodiment, as illustrated in FIG. 1, an adhering member 193 such as a double-sided adhesive tape is arranged on a bottom of the bare cell 100 so that a lower cover 195 may be coupled thereto. Additionally, plug members 190 cover openings 161 and 162 to which the coupling members 171 and 172 are inserted.

Referring to FIG. 3, shock absorbing layers 181 and 182 for absorbing or relieving an external shock are arranged at ends E1 and E2 of the upper cover 160. For example, the shock absorbing layers 181 and 182 may be arranged at the ends E1 and E2 along a long side (an X-direction) of the upper cover 160, and may include a first shock absorbing layer 181 arranged at a first end E1, and a second shock absorbing layer 182 arranged at a second end E2.

The shock absorbing layers 181 and 182 may be coupled to a lower portion of the upper cover 160 facing the bare cell 100. The shock absorbing layers 181 and 182 may have forms that are symmetrical to each other, or may have different forms so as to be fit for structures of the ends E1 and E2 of the upper cover 160 to which the shock absorbing layers 181 and 182 are coupled.

The shock absorbing layers 181 and 182 may be formed of a flexible material different from the upper cover 160, and any flexible material will do as long as the flexible material is more flexible than the upper cover 160 and is capable of absorbing an external shock. For example, the upper cover 160 may be formed of a polycarbonate material, and the shock absorbing layers 181 and 182 may be formed of a silicon-based or rubber-based material that is more flexible than the upper cover 160. However, the material for forming the shock absorbing layers 181 and 182 is not limited thereto.

The shock absorbing layers 181 and 182 may be integrally formed with the upper cover 160 in an injection-molding manner. For example, the shock absorbing layers 181 and 182 may be integrally formed with the upper cover 160 by an injection-molding process. In this regard, the upper cover 160 may be formed from a first material (e.g., polycarbonate) that is inserted into an injection-mold frame, and the shock absorbing layers 181 and 182 that are integrated to the upper cover 160 may be formed from a second material (e.g., a rubber-based or silicon-based material) that is inserted after the first material. Here, the second material fills an insertion space that is defined by the upper cover 160, is hardened to have a form that is fit for the upper cover 160, and forms the shock absorbing layers 181 and 182 that are integrated to the upper cover 160. However, the formation of the shock absorbing layers 181 and 182 is not limited thereto.

Figure 4:
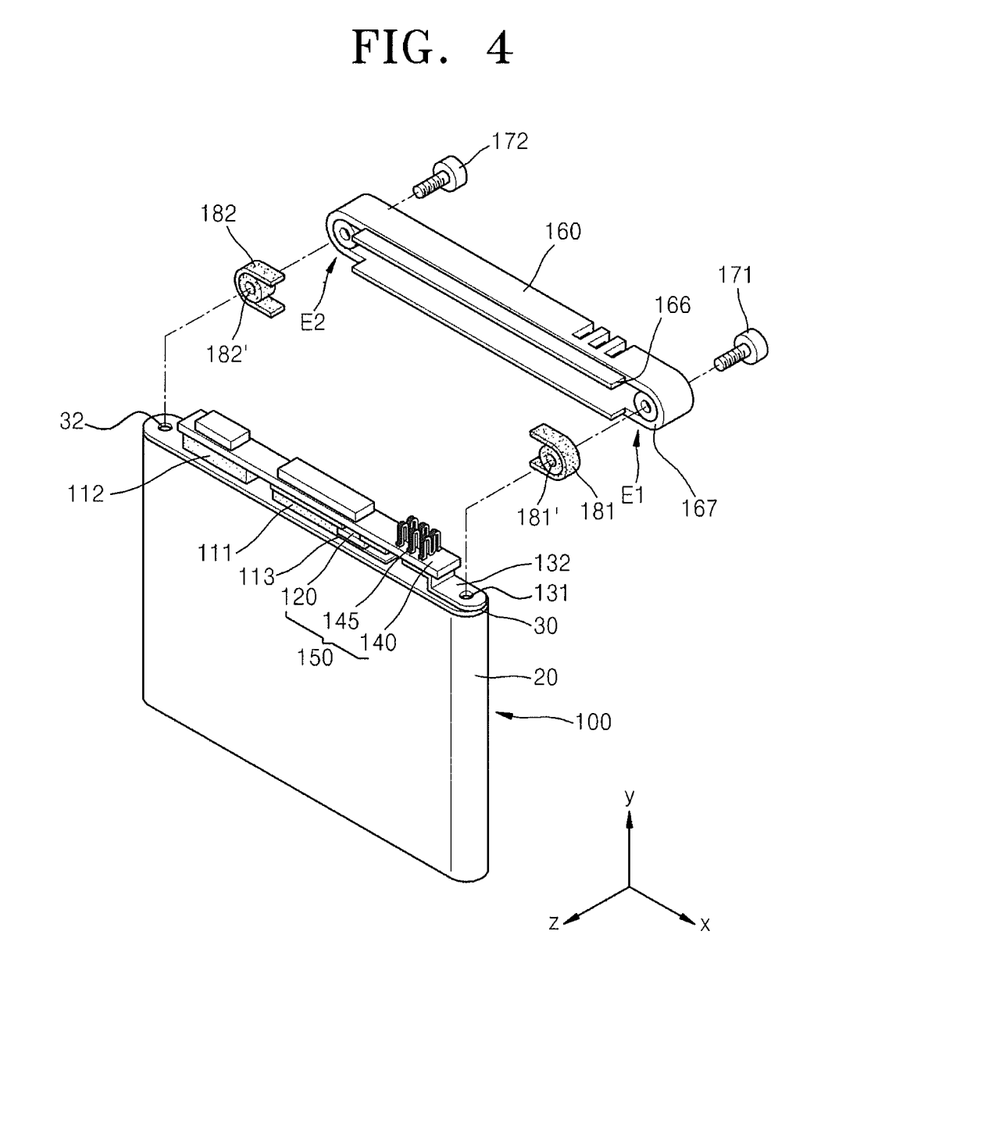
FIG. 4 is a perspective views of a battery pack according to another embodiment of the present invention.

Referring to FIG. 4, shock absorbing layers 181 and 182 are arranged at ends E1 and E2 of the upper cover 160. For example, the shock absorbing layers 181 and 182 may be arranged at first and second ends E1 and E2 of the upper cover 160. More specifically, the upper cover 160 may have a stepped portion formed by a tab 166 extending from the upper cover and may define an edge portion 167, wherein the shock absorbing layer 181 contacts the stepped portion and the edge portion. The shock absorbing layers 181 and 182 may not be integrally formed with the upper cover 160 but may be formed via separate processes and then may be coupled to the upper cover 160. The shock absorbing layers 181 and 182, and the upper cover 160 may be fixed on the cap plate 30 by using the coupling members 171 and 172 that are coupled to the cap plate 30 via the upper cover 160. Reference numerals 181' and 182' of FIG. 4 indicate openings that are formed in the shock absorbing layers 181 and 182, respectively, so as to allow the coupling members 171 and 172 to pass therethrough. Meanwhile, an appropriate coupling structure for coupling the upper cover 160 and the shock absorbing layers 181 and 182 as an assembly unit may be arranged in an interface where the upper cover 160 and the shock absorbing layers 181 and 182 contact each other.

The shock absorbing layers 181 and 182 are located between the upper cover 160 and the bare cell 100, and provide elastic support between the upper cover 160 and the bare cell 100. The shock absorbing layers 181 and 182 function to protect the bare cell 100 by absorbing or relieving a shock from the upper cover 160. For example, the shock absorbing layers 181 and 182 prevent a damage of the bare cell 100 which may occur when the upper cover 160 hits the bare cell 100 due to the impact from the battery pack being dropped.

The upper cover 160 and the bare cell 100 may be coupled to each other by using the coupling members 171 and 172. For example, as illustrated in FIG. 1, the coupling members 171 and 172 are coupled with coupling grooves 31 and 32 of the bare cell 100 via the openings 161 and 162 of the upper cover 160. Here, the coupling members 171 and 172 may include first and second coupling members 171 and 172 that are inserted into the ends E1 and E2 of the upper cover 160, respectively. For example, the first coupling member 171 may be coupled with the first coupling groove 31 of the cap plate 30 via the opening that is formed in the lead member 132 that extends to contact the cap plate 30. The opening of the lead member 132, and the first coupling groove 31 of the cap plate 30 are aligned with respect to each other, and the first coupling member 171 is coupled to the cap plate 30 via the opening. Meanwhile, the second coupling member 172 may be coupled with the second coupling groove 32 of the cap plate 30. The first and second coupling grooves 31 and 32 may have screw threads for coupling with the coupling members 171 and 172.

Figure 5:
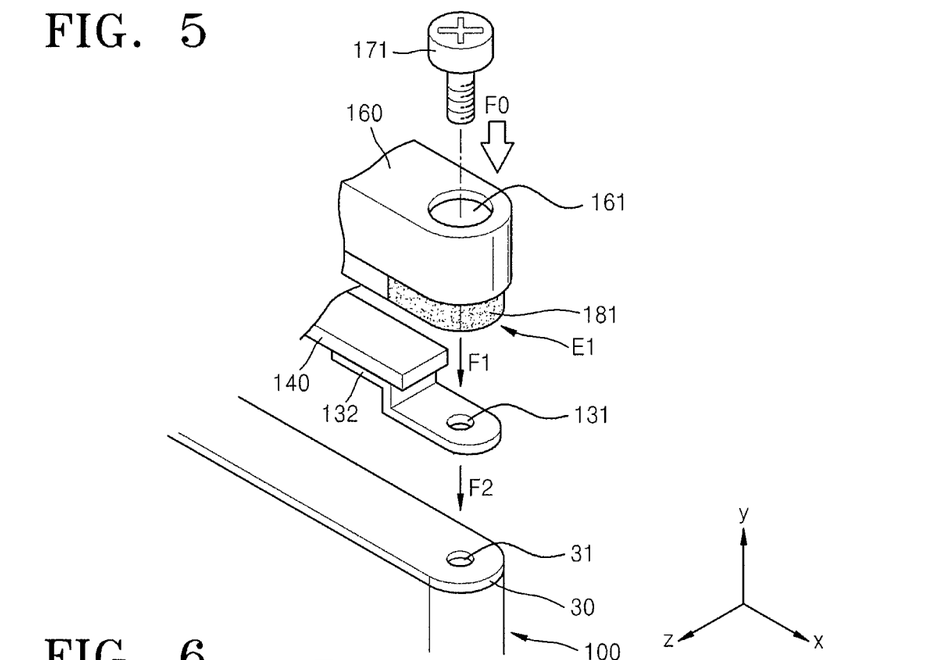
FIG. 5 is a detailed perspective view of a first shock absorbing layer arranged at a first end of an upper cover.

FIG. 5 is a detailed perspective view of the first shock absorbing layer 181 arranged at the first end E1 of the upper cover 160. Referring to FIG. 5, the circuit substrate 140 is arranged on the cap plate 30, and the lead member 132 that is connected to the circuit substrate 140 extends to contact the cap plate 30. The upper cover 160 is coupled to the cap plate 30 so as to receive the circuit substrate 140. The first shock absorbing layer 181 is arranged in a lower portion of the upper cover 160 so as to face the lead member 132 and the cap plate 30. The first coupling member 171 that is inserted into the opening 161 of the upper cover 160 is coupled with the coupling groove 31 on the cap plate 30 via the opening of the lead member 132.

The first shock absorbing layer 181 provides elastic support between the upper cover 160 and the lead member 132, and absorbs a shock therebetween. By doing so, the first shock absorbing layer 181 prevents a damage or structural deformation of the lead member 132 and/or the bare cell 100, and maintains low connection resistance between the lead member 132 and the bare cell 100.

For example, when the battery pack is fallen, a strong external shock may be applied to the upper cover 160. In a case where an external shock F0 is applied to an end E1 of the upper cover 160, the external shock F0 may be sequentially conveyed to the lead member 132 and the bare cell 100 which are in a close contact. Here, the first shock absorbing layer 181, which is located between the upper cover 160 and the lead member 132, intervenes in a shock conveyance procedure and then absorbs or relieves the external shock F0, so that shocks F1 and F2 that are applied to the lead member 132 and/or the bare cell 100 may be sharply reduced, and the damage or the structural deformation of the lead member 132 and/or the bare cell 100 due to the external shock F0 may be prevented.

The lead member 132 that forms a current path between the circuit substrate 140 and the bare cell 100 may be in close contact on the bare cell 100 by a pressure of the first coupling member 171 so as to maintain low resistance. When an interface between the lead member 132 and the bare cell 100 is deformed by the external shock F0, a contact status between the lead member 132 and the bare cell 100 is disrupted such that connection resistance is increased, and the increase of the connection resistance deteriorates a charge-discharge efficiency of the battery pack.

The upper cover 160 is assembled in a manner that the first shock absorbing layer 181 is located on the lead member 132 that is arranged on the bare cell 100, so that it is possible to prevent a damage of the lead member 132 or the bare cell 100 due to the shocks F1 and F2 from the upper cover 160, and to efficiently prevent an increase of connection resistance due to deformation of the lead member 132 and the bare cell 100.

Figure 6:
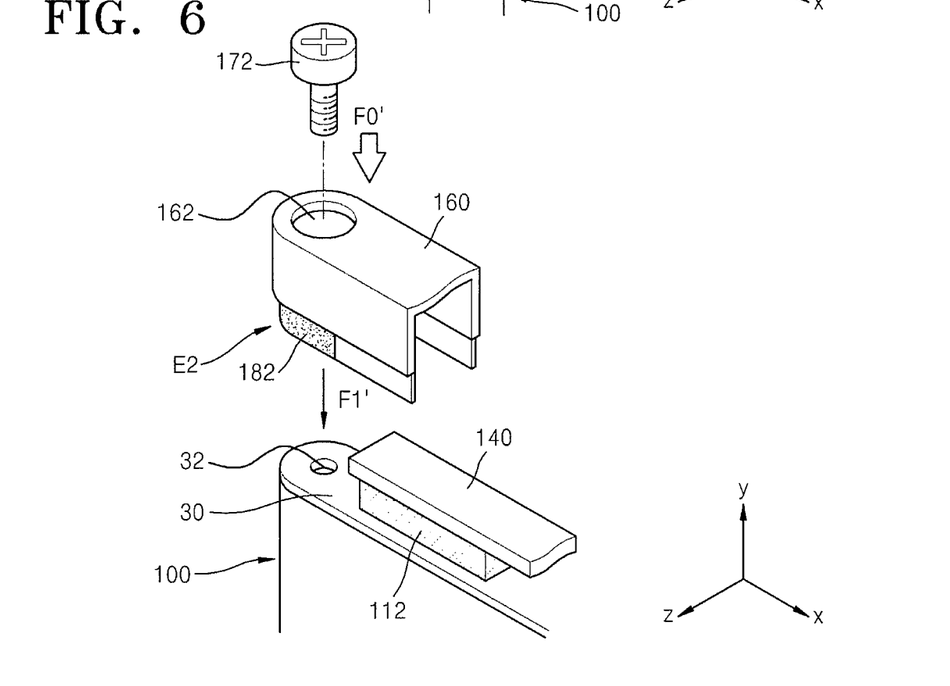
FIG. 6 is a detailed perspective view of a second shock absorbing layer arranged at a second end of the upper cover.

FIG. 6 is a detailed perspective view of the second shock absorbing layer 182 arranged at the second end E2 of the upper cover 160. Referring to FIG. 6, the circuit substrate 140 is arranged on the cap plate 30, and the upper cover 160 is coupled on the cap plate 30 so as to receive the circuit substrate 140. The second shock absorbing layer 182 is arranged at a lower portion of the upper cover 160 so as to face the cap plate 30. The second coupling member 172 that is inserted into the opening 162 of the upper cover 160 is coupled with the coupling groove 32 in the cap plate 30.

The second shock absorbing layer 182 provides elastic support between the upper cover 160 and the bare cell 100, and absorbs a shock therebetween, so that the second shock absorbing layer 182 prevents a damage or structural deformation of the bare cell 100. For example, if the battery pack is dropped, a strong external shock may be applied to the upper cover 160. In a case where an external shock F0' is applied to the second end E2 of the upper cover 160, the external shock F0' may be conveyed to the bare cell 100 that is in a close contact with the upper cover 160. Here, the second shock absorbing layer 182, which is located between the upper cover 160 and the bare cell 100, intervenes in a shock conveyance procedure and then absorbs or relieves the external shock F0', so that a shock F1' that is applied to the bare cell 100 may be sharply reduced, and a damage or deformation of the bare cell 100 due to the external shock F0' may be prevented or minimized.

Figure 7:
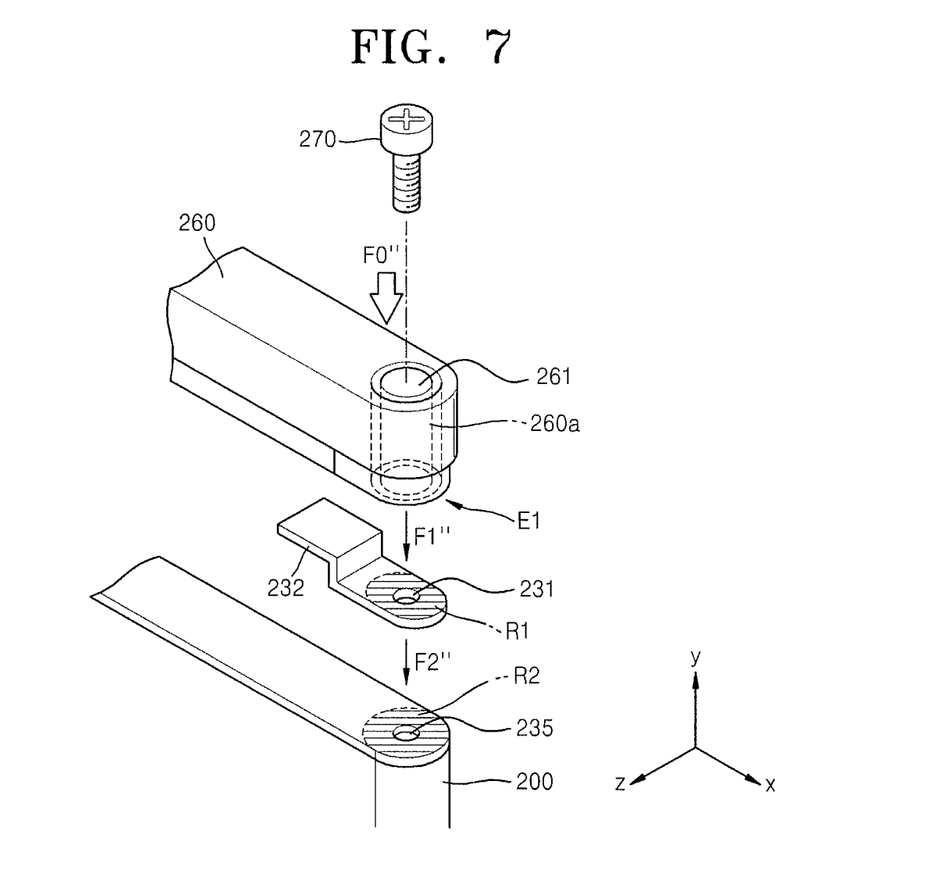
FIG. 7 is a perspective view of a battery pack according to a comparative example.

FIG. 7 is a perspective view of a battery pack according to a comparative example. Referring to FIG. 7, an upper cover 260 is assembled so as to contact a lead member 232 on a bare cell 200, and a shock absorbing member is omitted between the upper cover 260 and the lead member 232. In the battery pack of FIG. 7, the upper cover 260 receives an external shock F0" and then contacts the lead member 232 and the bare cell 200. Due to shocks F1" and F2", the lead member 232 and/or the bare cell 200 can be damaged and deformed such that the lead member 232 may not maintain its firm contact on the bare cell 200, or cause a gap to be formed between the lead member 232 and the bare cell 200. Thus, connection resistance between the bare cell 200 and a circuit substrate via the lead member 232 is increased, or in a worse case, a current path is cut.

For example, the upper cover 260 and the bare cell 200 may be formed of a plastic material and an aluminium material, respectively, which are hard materials having a small shock absorbing characteristic. Thus, there is a high possibility that the upper cover 260 and the bare cell 200 may damage each other due to a shock at a contact surface between the upper cover 260 and the bare cell 200. In this regard, when a repetitive shock such as impact from being dropped is applied, there is a high possibility that an upper portion of the bare cell 200 having a relatively low resistance to impact is damaged.

In one embodiment, a coupling member 270 is coupled with a coupling groove 235 in the bare cell 200 via an opening 261 of the upper cover 260 and a opening 231 of the lead member 232. A cylindrical hollow structure 260a for guiding the coupling member 270 may be arranged in the upper cover 260. If the cylindrical hollow structure 260a directly hits the lead member 232 and/or the bare cell 200, there is a high possibility that direct-under areas R1 and R2 of the lead member 232 and the bare cell 200 are damaged.

Also, since the coupling groove 235 for fixing an end of the coupling member 270 is deformed with the bare cell 200, the coupling member 270 does not provide an appropriate pressurized coupling force between the upper cover 260 and the bare cell 200, such that the lead member 232 may not be sufficiently coupled to the bare cell 200, or the coupling member 270 is decoupled and then the lead member 232 may be detached from the bare cell 200. As a result, connection resistance between a circuit substrate and the bare cell 200 is increased, which deteriorates a charge-discharge efficiency of the battery pack.

In the battery pack of FIG. 5, the first shock absorbing layer 181 is located between the upper cover 160 and the lead member 132 which are in close contact, so that it is possible to prevent the damage of the lead member 132 and the bare cell 100, and to maintain the connection resistance of the lead member 132 at a low level.

Also, in the battery pack of FIG. 5, the first shock absorbing layer 181 is arranged to protect the bare cell 100 by absorbing the shocks F1 and F2 that are applied to the lead member 132 and the bare cell 100, so that it is possible to prevent the damage and deformation of the bare cell 100, and to prevent an increase of the connection resistance that is caused by the deformation of the bare cell 100. That is, in the battery pack of FIG. 5, in spite of the external shock F0, the connection resistance between the lead member 132 and the bare cell 100 is not increased.

Due to a pressurized coupling force of the coupling member 171, the first shock absorbing layer 181 may be coupled in a compressed status, and elastic resilience of the first shock absorbing layer 181 may form an elastic bias in a direction in which the coupling member 171 and the lead member 132 are pushed in opposite directions. Accordingly, the lead member 132 is pressed onto the bare cell 100, so that the connection resistance of the lead member 132 is reduced, and the connection resistance is not increased, in spite of the external shock F0. Also, decoupling of the coupling member 171 is prevented, and coupling between the upper cover 160 and the bare cell 100 is improved, so that the lead member 132 located between the upper cover 160 and the bare cell 100 is firmly fixed, and the connection resistance is not increased, despite of the external shock F0.

Figure 8:
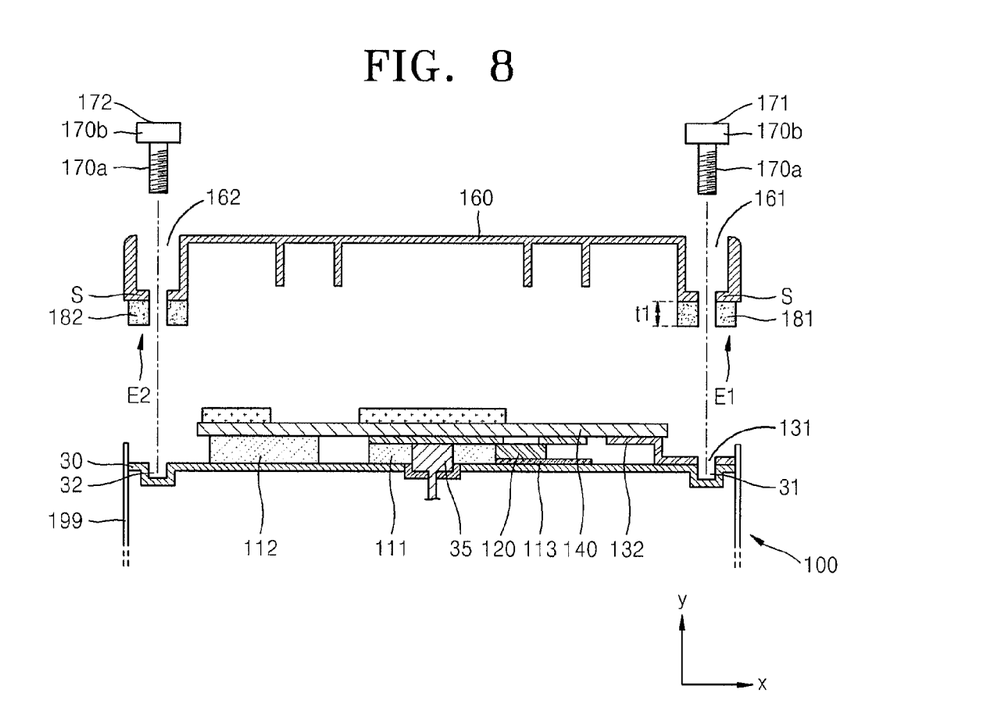
FIGS. 8 and 9 are cross-sectional views of the battery pack of FIG. 1.
Figure 9:
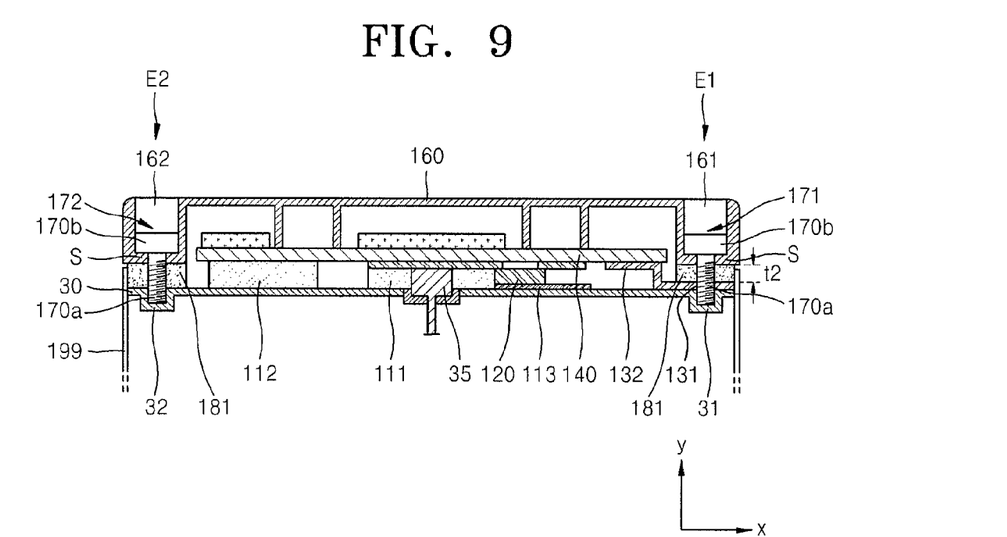
Figure 10:
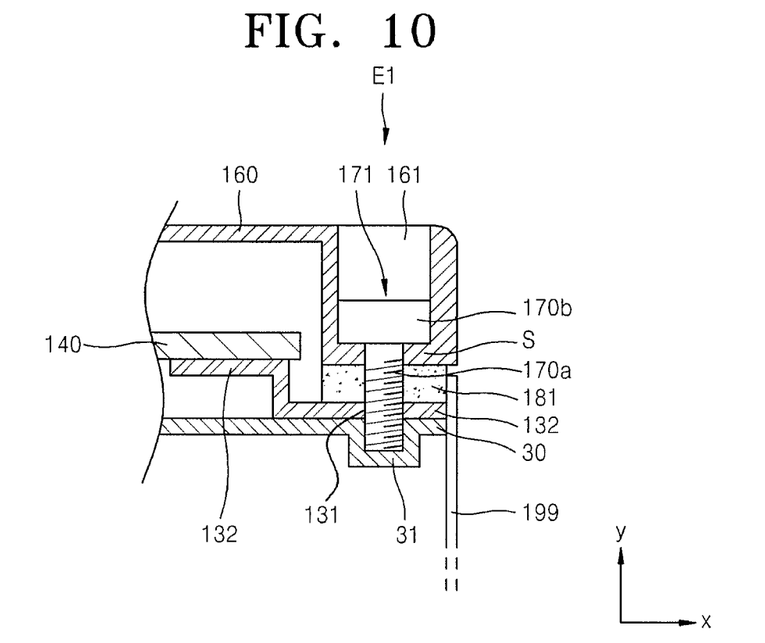
FIG. 10 is a detailed cross-sectional view of a first shock absorbing layer.
Figure 11:
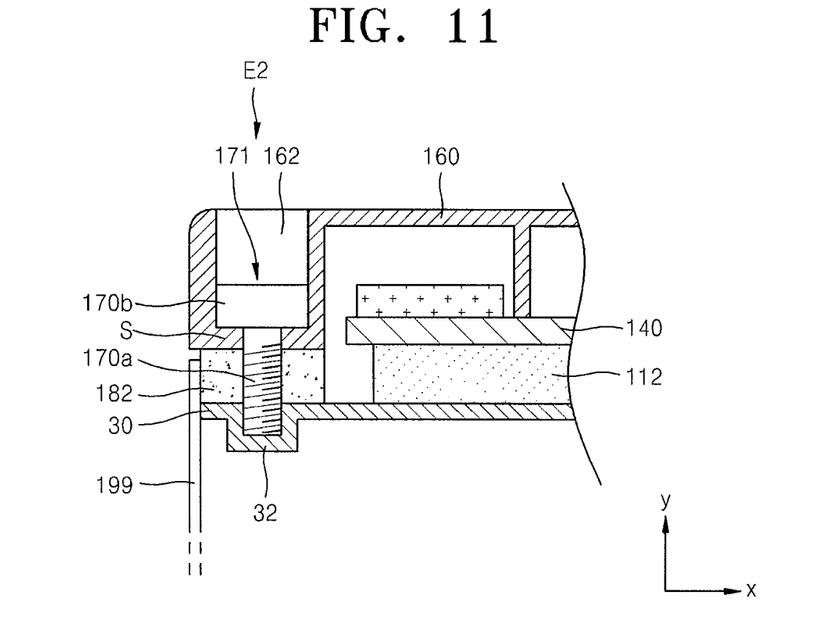
FIG. 11 is a detailed cross-sectional view of a second shock absorbing layer.

FIGS. 8 and 9 are cross-sectional views of the battery pack of FIG. 1. FIGS. 10 and 11 are detailed cross-sectional views of shock absorbing layers 181 and 182 that are arranged at ends E1 and E2 of an upper cover 160, respectively.

Referring to FIGS. 8 through 11, the upper cover 160 and a bare cell 100 may be coupled to each other via coupling members 171 and 172. The coupling members 171 and 172 penetrate the upper cover 160 and then are coupled with coupling grooves 31 and 32 of the bare cell 100. For example, each of the coupling members 171 and 172 may include an axis part 170a extending in a longitudinal direction, and a head part 170b extending from an end of the axis part 170a and extending in a radial direction. For coupling with the coupling grooves 31 and 32, screw threads may be formed in an outer surface of the axis part 170a.

Openings 161 and 162 for having the coupling members 171 and 172 inserted therein are formed in the upper cover 160. For example, first and second openings 161 and 162 configured to accommodate first and second coupling members 171 and 172 therein may be formed in the ends E1 and E2 of the upper cover 160.

The openings 161 and 162 may penetrate an entire thickness of the upper cover 160. For example, the openings 161 and 162 may have cylindrical forms, and may have inner diameters sufficient to receive the coupling members 171 and 172, respectively. The openings 161 and 162 may form mount portions S, each having a stepped shape and stepped inward in a radial direction. The mount portion S functions as a stopper that defines a position of each of the coupling members 171 and 172, and the coupling members 171 and 172 are inserted so that the head part 170b of each of the coupling members 171 and 172 is arranged to contact an upper surface of the mount portion S, and the mount portion S firmly supports the head part 170b of each of the coupling members 171 and 172.

The coupling grooves 31 and 32 may be formed at sides of the bare cell 100. More specifically, the coupling grooves 31 and 32 may be formed at sides of a cap plate 30, and may be open toward the upper cover 160 that faces the cap plate 30. The coupling grooves 31 and 32 may include a first coupling groove 31 formed at the side of the bare cell 100, and a second coupling groove 32 formed at the other side of the bare cell 100.

The coupling grooves 31 and 32 may be coupled with the coupling members 171 and 172 that penetrate the upper cover 160 and extend to contact the cap plate 30, and may be coupled to receiving ends of the coupling members 171 and 172. The coupling grooves 31 and 32 may have a shape that extends downward from a top surface of the cap plate 30 and has a predetermined depth, and screw threads may be formed at inner walls of the coupling grooves 31 and 32 so as to form the coupling with the coupling members 171 and 172.

The coupling members 171 and 172 are inserted into the openings 161 and 162 of the upper cover 160, penetrate the upper cover 160, and then are coupled with the coupling grooves 31 and 32 of the bare cell 100. The coupling members 171 and 172 are coupled in a manner that the head part 170b of each of the coupling members 171 and 172 is supported by the mount portion S of the upper cover 160, while the axis part 170a that extends from the head part 170b is coupled with each of the coupling grooves 31 and 32. That is, the head part 170b of each of the coupling members 171 and 172 is adhered to the mount portion S of the upper cover 160, the axis parts 170a of the coupling members 171 and 172 are fixed in the coupling grooves 31 and 32 of the bare cell 100, and the coupling members 171 and 172 couple the upper cover 160 and the bare cell 100 by using the head part 170b and the axis part 170a.

The mount portion S to which the head part 170b of each of the coupling members 171 and 172 is adhered is a part of the upper cover 160, and shock absorbing layers 181 and 182 are formed in a lower portion of the mount portion S, that is, between the mount portion S and the bare cell 100. The shock absorbing layers 181 and 182 may be arranged to directly contact the bare cell 100, or may be arranged to directly contact a lead member 132 on the bare cell 100. For example, the first shock absorbing layer 181 arranged at the first end E1 of the upper cover 160 contacts the lead member 132 on the bare cell 100, and the second shock absorbing layer 182 arranged at the second end E2 of the upper cover 160 contacts the bare cell 100.

The upper cover 160 is formed of a first material that is relatively hard, and the shock absorbing layers 181 and 182 are formed of a second material that is relatively soft. By forming the mount portion S by using the hard first material (corresponding to the upper cover 160), wherein the head part 170b of each of the coupling members 171 and 172 is in press contact with the mount portion S, the mount portion S may firmly support the coupling members 171 and 172, in spite of a locally-condensed pressure. Also, by placing the soft second material (corresponding to the shock absorbing layers 181 and 182) between the mount portion S and the bare cell 100, a pressure conveyance between the mount portion S and the bare cell 100 may be efficiently absorbed due to elastic transformation.

Referring to FIGS. 8 and 9, the shock absorbing layers 181 and 182 that are pressed by a pressurized coupling force of the coupling members 171 and 172 may be located between the upper cover 160 and the bare cell 100. For example, the shock absorbing layers 181 and 182 that have a first thickness t1 before the coupling with the coupling members 171 and 172 may be compressed to have a second thickness t2 after the coupling with the coupling members 171 and 172 (here, t1>t2), and due to the pressurized coupling force of the coupling members 171 and 172, the shock absorbing layers 181 and 182 may maintain their pressed status between the upper cover 160 and the bare cell 100. Accordingly, elastic resilience of the shock absorbing layers 181 and 182 works between the upper cover 160 and the bare cell 100, and the elastic resilience may form an elastic bias in a direction in which the head part 170b of the coupling member 171, and the lead member 132 are pushed in opposite directions. Thus, the lead member 132 may be elastically biased on the bare cell 100, and connection resistance between the lead member 132 and the bare cell 100 may be reduced. Also, since the lead member 132 is elastically biased on the bare cell 100, it is possible to prevent an increase of the connection resistance, in spite of an external shock.

Also, since the head part 170b of each of the coupling members 171 and 172 is elastically biased in a direction distant from the bare cell 100, decoupling of the coupling members 171 and 172 is prevented, and coupling between the upper cover 160 and the bare cell 100 is improved, so that the lead member 132 located between the upper cover 160 and the bare cell 100 is firmly fixed, and the connection resistance is not increased, in spite of the external shock.

In the battery pack of FIG. 1, the first shock absorbing layer 181 arranged at the first end E1 of the upper cover 160 contacts the lead member 132 on the bare cell 100, and the second shock absorbing layer 182 arranged at the second end E2 of the upper cover 160 contacts the bare cell 100. However, the embodiments of the present invention are not limited thereto, and thus, for example, all of the first and second shock absorbing layers 181 and 182 may contact the lead member 132 on the bare cell 100, or may contact the bare cell 100.

For example, in the battery pack of FIG. 1, the lead member 132 is arranged on only one end of the bare cell 100. However, in order to improve electric connection between the circuit substrate 140 and the bare cell 100, the lead members 132 may be arranged on both ends of the bare cell 100, and the first and second shock absorbing layers 181 and 182 may be arranged on the lead members 132.

In one embodiment, in the battery pack of FIG. 1, the first shock absorbing layer 181 arranged at the first end E1 of the upper cover 160 completely contacts the lead members 132. However, this complete contact is only an example, and thus, in another embodiment, a portion of the first shock absorbing layer 181 may contact the lead members 132 while the other portion of the first shock absorbing layer 181 may contact the bare cell 100 that does not have the lead members 132 arranged thereon.

In the battery pack of FIG. 1, the first and second shock absorbing layers 181 and 182 are formed at the ends E1 and E2 of the upper cover 160. However, the first and second shock absorbing layers 181 and 182 may be formed at a selected end of the upper cover 160. For example, the first shock absorbing layer 181 may be arranged at the first end E1 at which the lead member 132 is located so that connection resistance of the lead members 132 is reduced, but the second shock absorbing layer 182 may be omitted at the second end E2 so that the manufacturing costs or manufacturing processes may be reduced. However, when the shock absorbing layers 181 and 182 are simultaneously formed with the upper cover 160 by an injection-molding process, the manufacturing costs or manufacturing processes may not be sharply changed according to the number of the shock absorbing layers 181 and 182.

Table 1 shows a result of a free fall test for demonstrating an effect of the one or more embodiments of the present invention.

A battery pack according to the one or more embodiments of the present invention has a structure of FIG. 1. A comparative example is compared to the battery pack according to the one or more embodiments of the present invention, and the comparative example and the battery pack are different from each other at least due to the presence of (battery pack) or a lack of (comparative example) a shock absorbing layer. A resistance value IR was obtained by measuring resistance of a current path between a positive electrode and a negative electrode of the external connection terminal 145. With respect to each sample, 50 times, 100 times, 150 times, 200 times, and 250 times of a free fall have been performed, and variation of the resistance according to the free fall has been measured.

TABLE 1

|  | No. | Before drops IR(mohm) | After 50 drops IR(mohm) | After 100 drops IR(mohm) | After 150 drops IR(mohm) | After 200 drops IR(mohm) | After 250 drops IR(mohm) |
| --- | --- | --- | --- | --- | --- | --- | --- |
| comparative example | 1 | 115 | 114 | 116 | 125 | 126 | 136 |
|  | 2 | 113 | 115 | 120 | 122 | 127 | 147 |
| embodiment of present invention | 3 | 115 | 115 | 115 | 116 | 119 | 120 |
|  | 4 | 116 | 116 | 117 | 120 | 121 | 124 |

In sample 1 and sample 2 corresponding to the comparative example, a resistance increase of about 18% and 30% is measured after 250 times of a free fall. However, in sample 3 and sample 4 corresponding to the present invention, a resistance increase of about 4% and 7% is measured after 250 times of a free fall.

When the number of a free fall increases, connection resistance among configuring elements that form a current path is increased, such that a resistance increase occurs. In this regard, the resistance increase in the battery pack is smaller than the comparative example, and this is because shock absorbing layer 181 and 182 of the battery pack absorb a falling shock so that a structural damage of a lead member and an upper portion of a bare cell 100 contacting the lead member 132 is prevented, and an increase of connection resistance between the lead member 132 and the bare cell 100 is restrained.

It should be understood that the exemplary embodiments described therein should be considered in a descriptive sense only and not for purposes of limitation. Descriptions of features or aspects within each embodiment should typically be considered as available for other similar features or aspects in other embodiments.

EXPLANATION OF REFERENCE NUMERALS

| | |
| --- | --- |
| 10: electrode assembly | 11: positive electrode plate |
| 13: negative electrode plate | 15: separator |
| 17: positive electrode tab | 19: negative electrode tab |
| 20: can | 30: cap plate |
| 31, 32: coupling grooves | 100: bare cell |
| 111, 112: insulating members | 120: protecting device |
| 120a, 120b: and first and second connecting members | 120c: variable resistor |
| 131: opening | 132: lead member |
| 140: circuit substrate | 145: external connection terminal |
| 150: protective circuit module | 160: upper cover |
| 160: terminal hole | 161, 162: openings of upper cover |
| 170: lower cover | 171: coupling member |
| E1, E2: first and second ends | S: mount portion |

What is claimed is:

1. A battery pack comprising:
   a bare cell comprising an electrode assembly, a can housing the electrode assembly; and a cap plate sealing an open end of the can;
   a protective circuit module on the bare cell and comprising a lead member electrically coupling the protective circuit module to the bare cell;
   an upper cover coupled to the bare cell and covering the protective circuit module, wherein the upper cover defines a pair of mount portions stepped from a remainder of the upper cover, each mount portion having a first surface facing away from the bare cell, a second surface facing towards the bare cell, and an opening extending through the upper cover;
   a shock absorber entirely between the upper cover and the lead member, wherein a first surface of the shock absorber directly contacts the lead member and wherein a second surface of the shock absorber directly contacts the second surface of the upper cover such that the upper cover is entirely spaced from the lead member by the shock absorber; and
   a coupling member coupling the upper cover and the bare cell together, wherein the coupling member abuts the first surface of a respective mount portion such that the mount portion is between a portion of the coupling member and the shock absorber, and wherein the coupling member extends through an opening in the lead member.

2. The battery pack of claim 1, wherein the shock absorber comprises a rubber-based material or a silicon-based material.

3. The battery pack of claim 1, wherein the upper cover and the shock absorber are integral as a single unit.

4. The battery pack of claim 1, wherein the shock absorber directly contacts the lead member.

5. The battery pack of claim 1, wherein the shock absorber biases the lead member towards the bare cell.

6. The battery pack of claim 1, wherein the opening in the lead member is aligned with an opening on the shock absorber, and wherein the coupling member extends through the openings on the lead member and on the shock absorber to couple the lead member and the shock absorber together.

7. The battery pack of claim 1, wherein the shock absorber comprises a plurality of shock absorbing members spaced from each other.

8. The battery pack of claim 7, wherein a thickness of a first one of the shock absorbing members is different from a thickness of a second one of the shock absorbing members.

9. The battery pack of claim 1, wherein the upper cover and the shock absorber have openings that are aligned with each other and wherein the coupling member extends through the openings on the upper cover and the shock absorber to couple the upper cover and the shock absorber together.

10. The battery pack of claim 1, wherein the coupling member is coupled to the cap plate and couples the upper cover, the shock absorber, the lead member and the cap plate of the bare cell together.

\* \* \* \* \*